Patented Aug. 30, 1932

1,874,639

UNITED STATES PATENT OFFICE

WINFIELD SCOTT, OF AKRON, OHIO, ASSIGNOR TO THE RUBBER SERVICE LABORATORIES CO., OF AKRON, OHIO, A CORPORATION OF OHIO

RUBBER VULCANIZATION ACCELERATOR

No Drawing.  Application filed October 9, 1925. Serial No. 61,587.

The present invention relates to a process of manufacturing vulcanized rubber of high quality, and it has, for its primary object, the provision of accelerators of characteristic curing powers, which may be employed in the production of such rubber.

Mercapto-benzo-thiazole having the formula

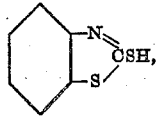

and which is one of the many reaction products obtained by heating a mixture of thiocarbanilide and sulfur, has been described as a rubber vulcanization accelerator of some value, but I have now found that its usefulness can be greatly increased by reacting it with certain other compounds which are hereinafter fully described and using the materials so obtained as accelerators.

Mercapto-compounds are somewhat acidic in nature, due to the presence of the —SH group contained therein, and will therefore form salts with various metals, and will also react with the more stable and less volatile of the organic bases to form compounds which may be termed salts, and which themselves possess particularly high value as accelerators of the rubber vulcanization process as is hereinafter set forth. Certain of the metallic salts of mercapto-compounds have already been described as vulcanization accelerators, but my invention is concerned with the use of the more powerful accelerating materials hereinafter described in detail. In fact, I may conclude from the experiments hereinafter set forth in more detail, that a mercaptan or a derivative of a mercaptan, to display its accelerating properties to the greatest degree, preferably should have within the molecule, some group or grouping which will tend more or less completely to counteract the acidic nature of the —SH group. Extensive experimentation, carried out on this problem, as evidenced by the characteristic examples hereinafter described, indicates that when a mercaptan compound is so treated as to decrease its natural acidity, or, conversely, to increase its basicity, the accelerating action of the modified mercaptan is considerably improved.

Various types of organic materials may be employed to decrease the acidic nature of mercapto-compounds. The aldehyde ammonia reaction products, although not very strongly basic of themselves, will react with aromatic mercapto-compounds, and particularly with the aromatic mercapto-thiazole derivatives to produce compounds having desirable vulcanization accelerating properties. Hexamethylene-tetramine $(CH_2)_6N_4$ for example, reacts slowly with mercapto-benzo-thiazole at temperatures ranging from 140° to 225° C. to produce a dark resinous product. At temperatures somewhat above 225° C., decomposition of the product is liable to occur, accompanied by the evolution of substantial quantities of hydrogen sulfid, thereby producing a hard, carbonized resinous material of impaired accelerating power.

One method of preparing a reaction product possessing desirable properties for the object desired, comprises heating a mixture of approximately 140 parts of hexamethylene tetramine (dry, or in aqueous solution, as preferred), with approximately 165 parts of mercapto-benzo-thiazole at a temperature of 150° C. or thereabout, for approximately an hour, during which time a reaction takes place. After the initial reaction is over, the mixture is heated to about 200° C. and maintained thereat for a period of about four hours, whereupon after cooling, a dark resinous product is obtained which can be ground to a dark brown powder.

Other means of carrying out the reaction described above may, of course, be employed. Thus, in place of hexamethylene tetramine in crystalline form, I may use an aqueous solution thereof, prepared, for example, by saturating the necessary quantity of commercial formaldehyde solution with ammonia. Other aldehyde-ammonia compounds may also be used, but because of their volatility, it is then usually necessary to use a closed reaction vessel to prevent loss of a portion of the interacting substances. If preferred, the entire reaction may be carried out in a closed reaction vessel, and the mixture heated at once to approximately 200° C., but if this be done, the volatile reaction products should be removed, after the reaction is completed, by means of a vacuum, or by open heating at about 200° C. Other proportions of the reacting ingredients may also be employed than those mentioned above. Thus, instead of reacting equal molecular parts of the materials as shown, I may combine one proportion of hexamethylene-tetramine with one, two, or three molecular proportions of the mercaptan. The reaction product obtained as described may be compounded in the well known manner in the proportion of 0.5 parts of accelerator with one hundred parts of rubber, (for example, smoked sheets), 5 parts of zinc oxide, and 3 parts of sulfur, and the mixture vulcanized in a press at the temperature given by steam under 40 pounds pressure per square inch. After heating under these conditions, for about 15 minutes, it was found that, in a test sample, the load necessary to produce 700% elongation was approximately 1110 pounds per square inch, while the sample had an ultimate elongation of 880% and a tensile strength at break of 2850 pounds/in$^2$. It was observed that vulcanization for a longer period of time resulted in no serious depreciation in the quality of the product.

Another important class of bases which may be employed to react with the mercaptans to produce compounds having vulcanization accelerating properties, is biguanide

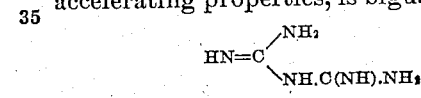

and its derivatives. For example, tri-phenyl-biguanide

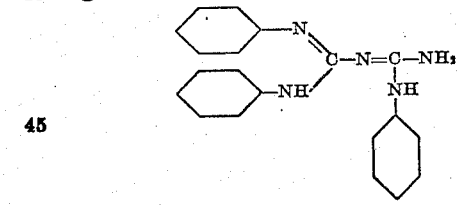

and a mercaptan may be heated together, preferably in equi-molecular proportions at a temperature slightly above the melting point of the materials for a period of about an hour, and a resinous material is obtained upon allowing the mixture to cool. This product, after grinding, is incorporated in the proportion of 0.5 parts of accelerator into a mix comprising 100 parts of rubber, 5 parts of zinc oxide and 3.5 parts of sulfur and the rubber compound vulcanized in a press in the usual manner for about an hour at the temperature given by 20 pounds of steam per square inch. The resulting product was found to possess a tensile strength at break of about 3000 pounds per square inch. This same accelerator may likewise be used for the manufacture of a tread stock comprising 51 parts of rubber (smoked sheets), 20 parts of zinc oxide, 19 parts of carbon black, 3.5 parts of mineral rubber, 1.5 parts of sulfur, and 0.25 parts of accelerator. The product, after vulcanizing in a press, under the temperature given by 40 pounds steam pressure per square inch for about an hour, was found to possess a tensile strength of approximately 3215 pounds per square inch, and an ultimate elongation of about 563%. Products possessing a greater tensile strength may readily be prepared by using a larger amount of accelerator, and preferably with a proportionate decrease in sulfur.

A hard rubber of good commercial characteristics may be obtained by vulcanizing under 50 pounds steam pressure for about one hour and thirty minutes, a mixture comprising 100 parts of rubber, 15 parts of zinc oxide, 35 parts of sulfur, and 2 parts of the reaction product of mono-phenyl-biguanide and mercapto-benzo-thiazole. In every case where the mercapto derivatives of the type herein described were used as accelerators, it was observed, upon testing the vulcanized product, that the load required to produce certain elongations, (for example, 700%) and the tensile strength at break, were greater, while the ultimate elongations were less than were obtained in a rubber stock of the same formula wherein an equivalent quantity of mercapto-benzo-thiazole itself was employed. This proves that a product of higher quality is obtained by the use of my new accelerators, than is realized by employing the mercaptan itself.

The guanyl ureas, iso ureas, thio-ureas and iso-thio-ureas are examples of other organic basic substances that may be reacted with non-volatile mercaptans to form compounds that are stable in the dry state. Guanyl-urea

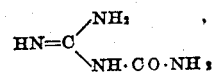

for example, reacts with mercapto-benzothiazole or with mercapto-benzoxozole, and the like compounds to form products that possess desirable vulcanization accelerating properties. Mono-phenyl-guanyl-thiourea or di-ethyl-guanyl-thioureas may also be reacted with the mercapto compounds to produce accelerators of the type hereinbefore described.

Other bases than those set forth above may also be combined advantageously with a mercaptan to prepare compounds of the type mentioned, and which possess desirable vulcanization accelerating characteristics. Thus, as examples of such bases, I may employ mono, di, tri, tetra and penta phenyl or tolyl biguanide, the organic ammonium derivatives such as tetra-methyl-ammonium hydroxide $N(CH_3)_4OH$ and like compounds, primary and secondary amines such as piperidine and di-benzyl-amine and the like, secondary diamines, for example piperazine

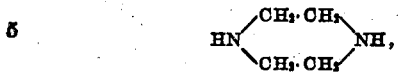

tri-methyl-sulfonium-hydroxide $$(CH_3)_3.S—OH,$$

as well as other organic compounds possessing basic properties.

Furthermore, it is to be understood that while I have specifically mentioned mercapto-benzo-thiazole as an example of a mercaptan, other compounds may, as I have found, be used successfully for the preparation of my preferred type of accelerators. Thus, I may use, as a mercaptan compound, the aliphatic mercaptans, such as ethyl mercaptan, butyl mercaptan, and the like; aromatic mercaptans, such as thio-phenol, thio-cresol and the like; benzo-thiazole mercaptans and substitution products thereof, such as mercapto-tolyl-thiazole; the naphthyl-thiazole-mercaptans; thio-oxy-indole

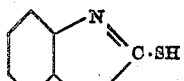

and substitution products thereof; amido-thio-phenols and derivatives; 2-mercapto-thiozolin

and derivatives; the thio-anilides

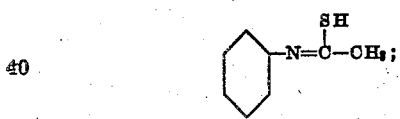

; 2-mercapto-benzimid azol; mercapto-iminazole

the thio-amides; thio-ammelin

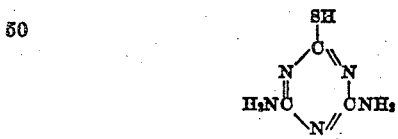

that is, mercapto-compounds of the aliphatic and aromatic series. My invention, then, covers broadly the use as accelerators of the vulcanization of rubber, of those compounds formed by the reaction of organic bases with compounds of the aliphatic or aromatic series containing the —SH grouping, that is, the mercaptans and mercaptan derivatives. The scope of my invention is to be understood as not limited by the examples given, which are illustrative only, but is limited solely by the claims hereinafter set forth, wherein I intend to claim all novelty inherent in my invention which is permissible in view of the prior art.

What I claim is:—

1. The process of vulcanizing rubber which comprises heating a mixture of rubber and sulfur in the presence of the reaction product of a mercapto-compound, and a fully saturated condensation product of ammonia and an aldehyde.

2. The process of vulcanizing rubber which comprises heating a mixture of rubber and sulfur in the presence of the reaction product of a mercapto-compound and a condensation product of ammonia and an aliphatic aldehyde.

3. The process of vulcanizing rubber which comprises heating a mixture of rubber and sulfur in the presence of the reaction product of an aromatic mercapto-derivative and a condensation product of ammonia and an aliphatic aldehyde.

4. The process of vulcanizing rubber which comprises heating a mixture of rubber and sulfur in the presence of the reaction product of mercapto-benzo-thiazole and hexamethylene-tetramine.

5. The process of vulcanizing rubber which comprises heating a mixture of rubber and sulfur in the presence of the reaction product of a compound formed by reacting equal molecular proportions of mercapto-benzo-thiazole and hexamethylene-tetramine.

6. The vulcanized rubber product produced by heating rubber and sulfur in the presence of a compound produced by reacting a mercapto-compound and a fully saturated condensation product of ammonia and an aldehyde.

7. The vulcanized rubber product produced by heating rubber and sulfur in the presence of a compound produced by reacting an aromatic mercapto-derivative with a condensation product of ammonia and an aliphatic aldehyde.

8. The vulcanized rubber product produced by heating rubber and sulfur in the presence of a compound produced by reacting mercapto-benzo-thiazole with hexamethylene-tetramine.

9. The vulcanized rubber product produced by heating rubber and sulfur in the presence of a compound produced by reacting equal molecular proportions of mercapto-benzo-thiazole and hexamethylene-tetramine.

10. The process of vulcanizing rubber which comprises heating a mixture of rubber and sulfur in the presence of the reaction product obtained by combining an organic compound containing the —SH group with hexamethylene-tetramine.

11. The process of vulcanizing rubber which comprises heating a mixture of rubber and sulphur in the presence of an accelerator comprising the reaction product of a mercaptan with a fully saturated, organic base of cyclic structure.

12. The process of vulcanizing rubber which comprises heating a mixture of rubber and sulphur in the presence of an accelerator comprising the reaction product of a mercaptan with a compound resulting from the interaction of an aliphatic aldehyde and ammonia.

13. The process of vulcanizing rubber which comprises heating a mixture of rubber and sulphur in the presence of an accelerator comprising the reaction product of a mercaptan with a compound resulting from the interaction of an aliphatic aldehyde and ammonia.

14. The vulcanized rubber product produced by heating rubber and sulphur in the presence of an accelerator comprising the reaction product of a mercaptan with a fully saturated, organic base of cyclic structure.

15. The vulcanized rubber product produced by heating rubber and sulphur in the presence of an accelerator comprising the compound obtained from the reaction of a mercaptan with the product resulting from the interaction of an aliphatic aldehyde and a basic nitrogen containing compound.

In testimony whereof I affix my signature.

WINFIELD SCOTT.